June 20, 1967 R. A. HAYES ETAL 3,326,157
DIFFERENTIAL FEED FOR SEWING MACHINES
Filed Aug. 10, 1964 6 Sheets-Sheet 1

R. A. HAYES and
R. W. FLETCHER
INVENTORS

BY Mason, Porter, Diller & Stewart

ATTORNEYS

R. A. HAYES
R. W. FLETCHER
INVENTORS

June 20, 1967  R. A. HAYES ETAL  3,326,157
DIFFERENTIAL FEED FOR SEWING MACHINES
Filed Aug. 10, 1964  6 Sheets-Sheet 6

R. A. HAYES and
R. W. FLETCHER
INVENTORS

BY Mason, Porter, Diller & Stewart

ATTORNEYS

United States Patent Office 3,326,157
Patented June 20, 1967

3,326,157
DIFFERENTIAL FEED FOR SEWING MACHINES
Robert A. Hayes, Franklin Park, and Roy W. Fletcher, Riverdale, Ill., assignors to Union Special Machine Company, Chicago, Ill., a corporation of Illinois
Filed Aug. 10, 1964, Ser. No. 388,437
12 Claims. (Cl. 112—209)

ABSTRACT OF THE DISCLOSURE

Sewing machine structure is disclosed wherein provision is made for differential feed dog movement, variable during normal running of the machine under control of the operator, manually, as by knee press or treadle, and wherein provision can be made for main feed dog movement at the rate of from five to twenty-two stitches per inch, with differential feed dog travel as much as 3/8 of an inch, means for bringing about variations in the relative feed movements are provided and there is included a bracket supporting an adjuster sector, manually operable and having indicia thereon viewable by an operator of the machine for indicating the feed ratio between the differential feed dog and the main feed dog.

---

The following specification relates to improvements in a differential feed for sewing machines, especially adapted for use in lockstitch machines.

Characteristically, such machines include two four-motion feed dogs having a relative differential action. In many instances it is desired to have different lengths of feed for the respective feed motions. Thus in general, the usual differential feed machine is set for example to produce fifteen stitches per inch. Under such circumstances, the differential feed dog is required to provide a higher range in which the material is gathered, for example as much as five times the capacity of the main feed dog. To accomplish this result, the differential feed mechanism must be adjustable relative to the drive of the main feed dog. This result should be accomplished during the normal running of the sewing machine.

This result is dependent upon the linkage that drives the differential feed dog and is under the control of the operator, manually, as by a knee press or treadle arrangement. Thus, while the main feed dog may make from five to twenty-two stitches per inch, the differential feed dog can be caused to travel as much as 3/8 of an inch.

In other circumstances it may be desirable to reverse the ratio of the movement of the differential feed dog relative to the main feed dog, so that the former will have a less travel. In this way the material which is being sewed may be caused to stretch rather than gather or pucker.

The invention is in the type of work-feeding mechanism of which the patent to Hayes, Feb. 16, 1954, No. 2,669,205 is an example.

In like manner, use is made of the variable feed stroke of the four-motion dog, as disclosed in the patent of Covert Sept. 16, 1958, No. 2,851,976.

One of the objects of the invention is to provide means by which the relative movements of the main feed dog and the differential feed dog can be varied while the machine is in operation.

Another object of the invention is to provide novel means by which this adjustment can be carried out.

A still further object of the invention is to enable the operator visually to observe the extent of the adjustment accomplished.

Figure 1:
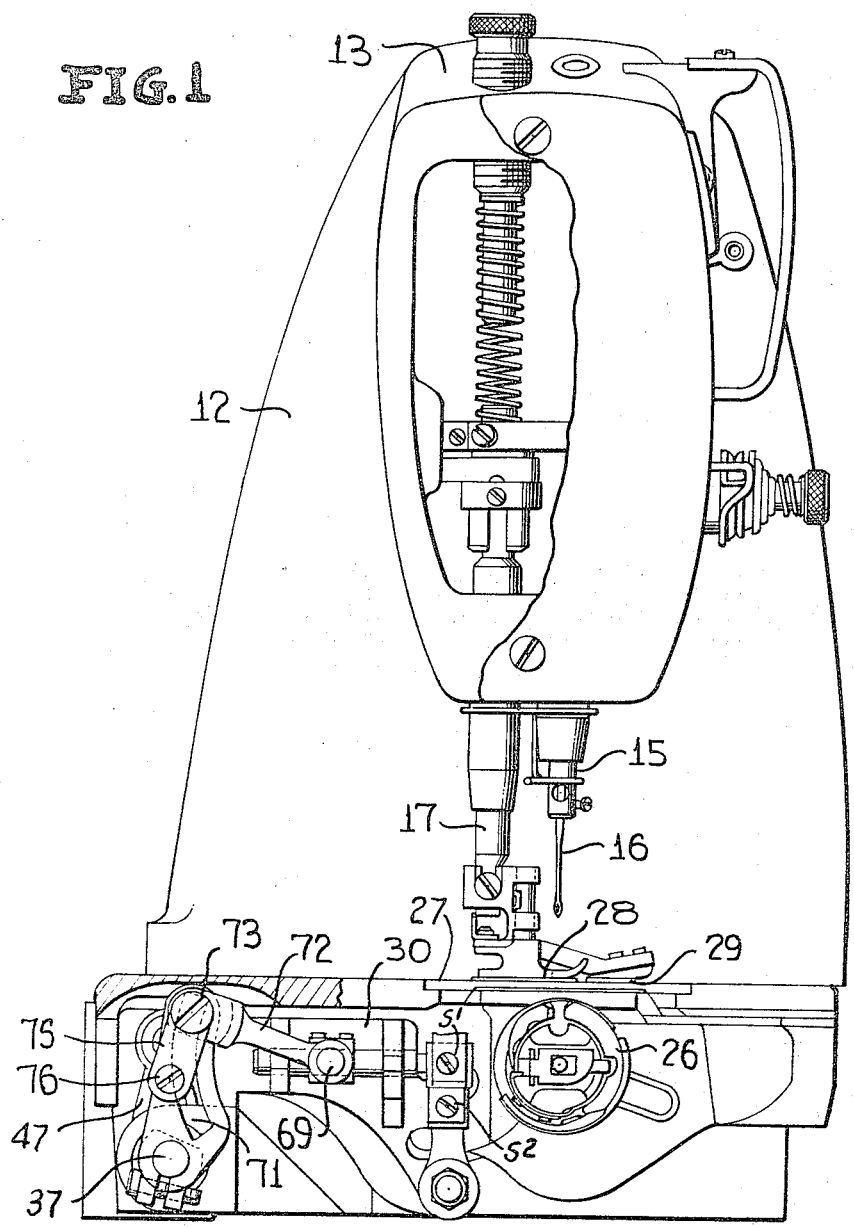
Figure 2:
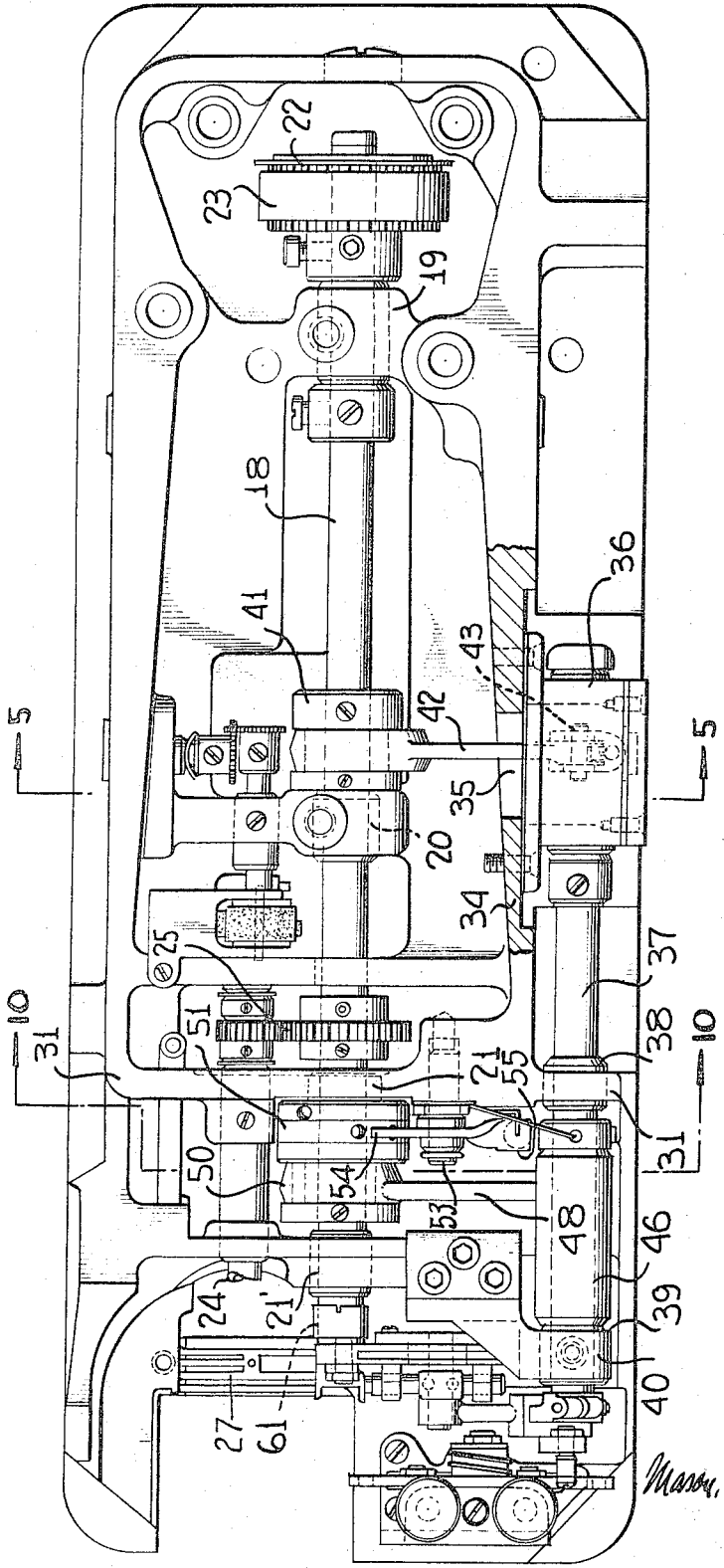
Figure 3:
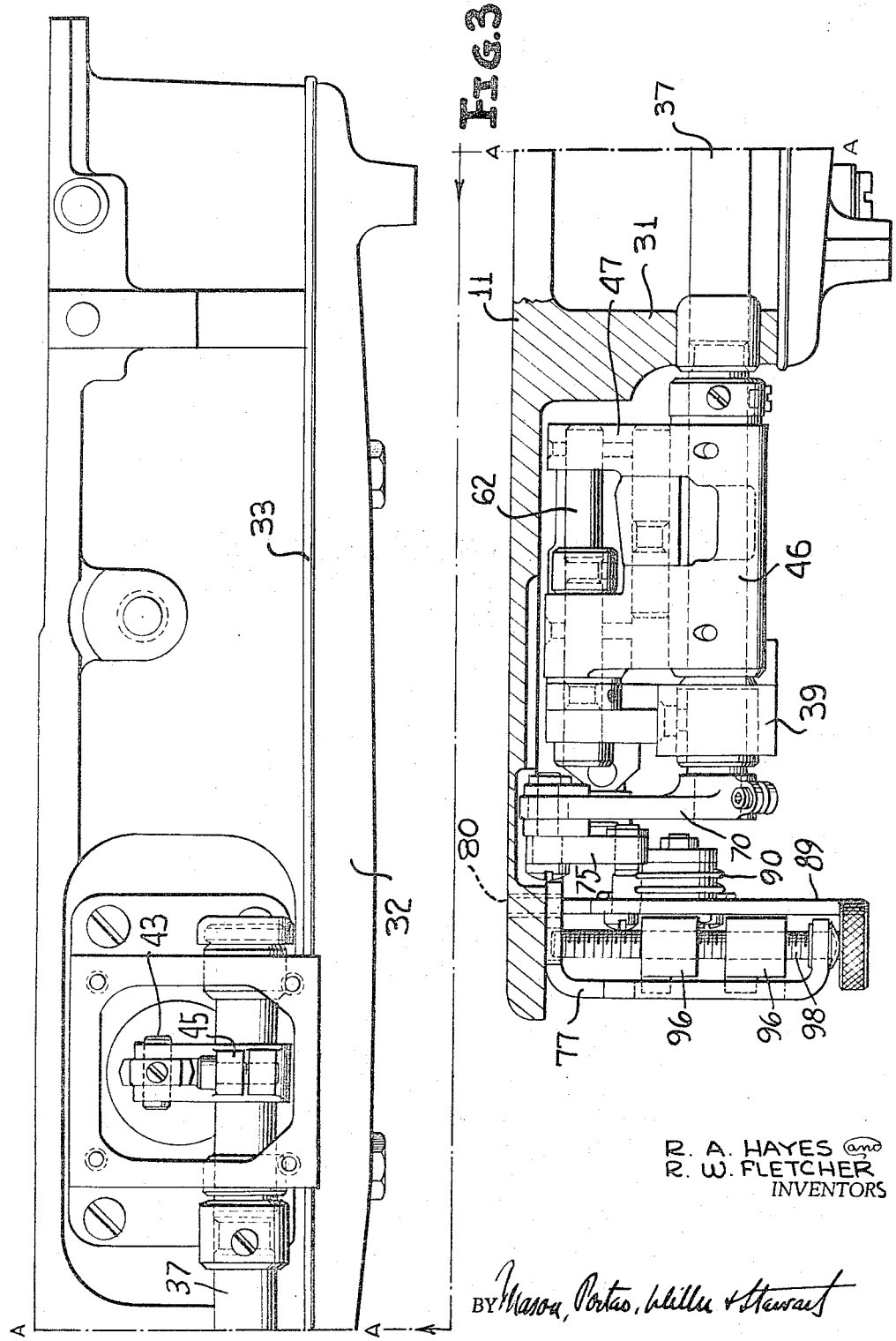
Figure 4:
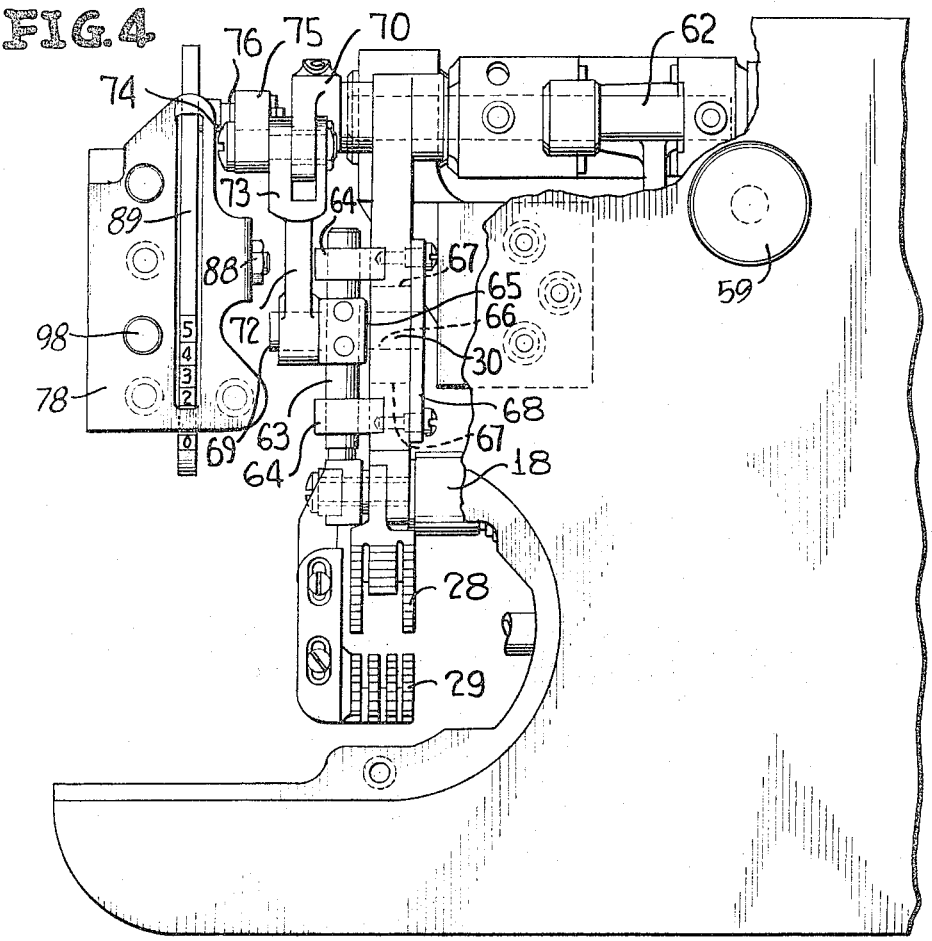
Figure 5:
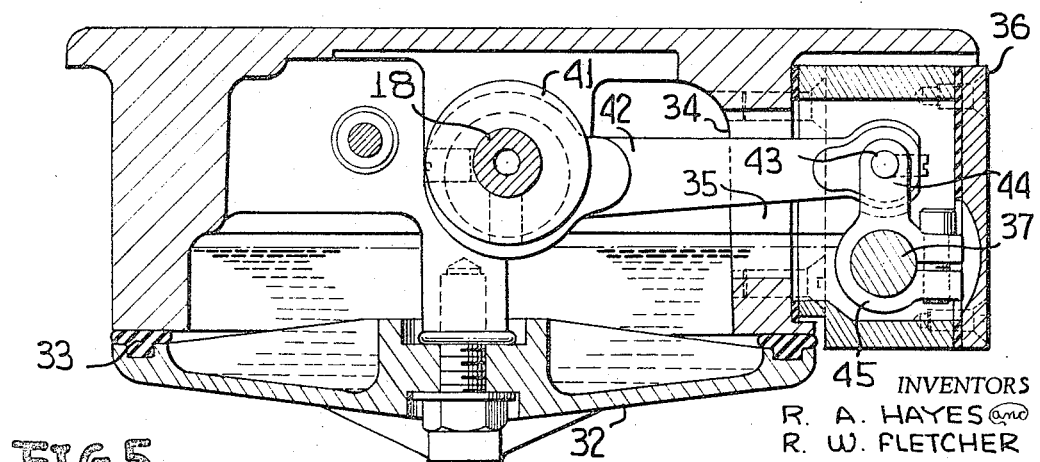
Figure 6:
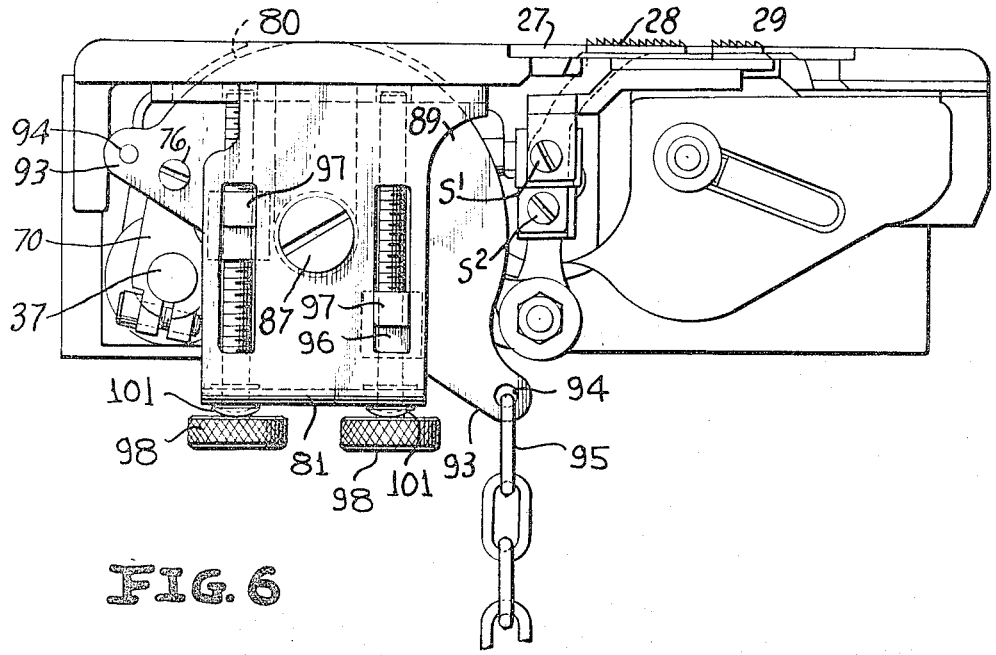
Figure 7:
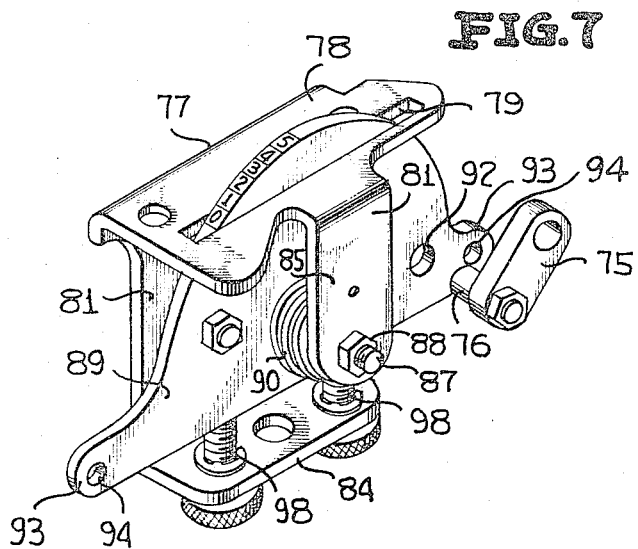
Figure 8:
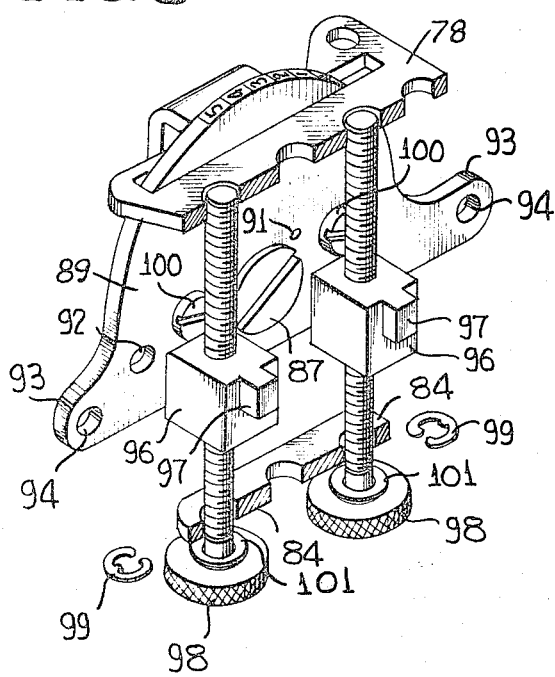
Figure 9:
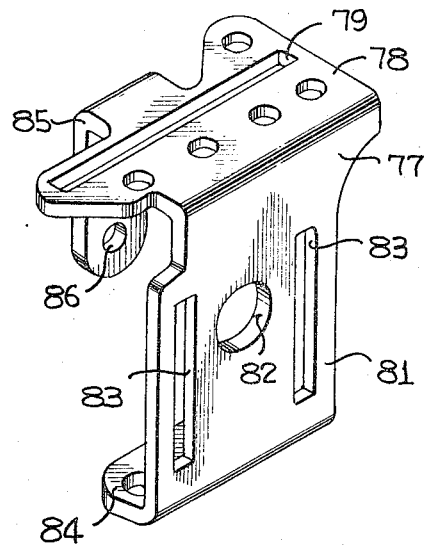
Figure 10:
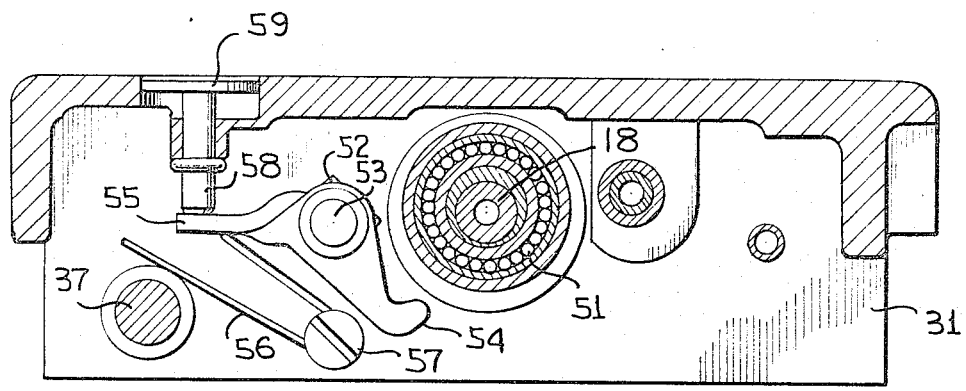

The preferred form of our invention has been illustrated by way of example in the accompanying drawings in which:

FIGURE 1 is an end elevation partly in section showing a sewing machine embodying the invention;
FIGURE 2 is a bottom plan view of the same partly in section;
FIGURE 3 is a side elevation partly in section;
FIGURE 4 is a fragmentary top plan view;
FIGURE 5 is a vertical cross-section on line 5—5 of FIGURE 2;
FIGURE 6 is a vertical end view;
FIGURE 7 is a perspective view of the adjustment means;
FIGURE 8 is an opposite perspective view of the adjustment;
FIGURE 9 is a perspective view of adjusting plate; and
FIGURE 10 is a vertical cross-section on line 10—10 of FIGURE 2.

In the form of the invention illustrated in the drawings, 11 indicates a supporting base for a lockstitch sewing machine of the usual type. A vertical standard 12 rises from one end of the base and carries an overhanging arm 13. The arm 13 terminates in the usual needle head.

A horizontal rotary drive shaft (not shown) extends through the standard, the arm and into the needle head.

The usual needle bar 15 carries the needle 16 for vertical reciprocation. A presser bar 17 reciprocates vertically in the rear of the needle bar 15.

A lower drive shaft 18 is journalled horizontally within the base and in bearings 19, 20, 21 and 21'. Below the standard 12, the shaft 18 has a gear 22. This gear is connected by means of toothed belt 23 with the upper drive shaft.

A hook shaft 24 is journalled in the base parallel to the drive shaft 18. The hook shaft is connected operatively to the lower drive shaft 18 by means of multiplying gearing 25. The shaft 24 terminates in the rotary hook 26 in the vertical plane of the needle bar 15 and presser bar 17.

A slotted throat plate 27 is fitted within the cloth plate of the base beneath the needle bar and presser bar. A main feed dog 28 rests in a slot in the throat plate 27 for the usual four-motion feeding.

In advance or in front of the main feed dog and in the same or a second slot of the throat plate, is a differential feed dog 29. The rear end of the main feed dog 28 is screwed into the side face of a feed bar 30. In FIGURES 1 and 6 the screws for both main and differential feeds can be seen and both feed dogs are attached to their respective feed bars on the left-hand side, the upper screw S' serving to secure the differential feed dog 29 and the lower screw S² serving to secure the main feed dog 28.

The base has a transverse wall 31 and the area extending thence to the end under the standard 12 is formed as a lubricant chamber in which that end of the drive shaft 18 is journalled in bearings 19 and 20. The base has a removable bottom 32 fastened in place with an oil-tight gasket 33.

One side wall 34 is apertured as at 35. Outside of the aperture in the side wall 34 is an oil-tight housing 36. A rock shaft 37 for the differential feed dog is journalled in this housing and extends through a bushing 38 in the transverse wall 31. The outer end of the shaft 37 is journalled in a bearing 39 carried by a depending end wall 40.

Adjacent the bearing 20, the drive shaft 18 carries an eccentric 41 of known construction. A pitman 42 on the eccentric 41 passes through the aperture 35. The small end of the pitman carries a pivot pin 43 for a yoke 44 on a rock arm 45 fastened on the rock shaft 37. The eccentric drive comprising eccentric 41, pitman 42 and rock arm 45 rocks the rock shaft 37 upon rotation of the drive shaft 18.

Between the bushing 38 and bearing 39, the shaft 37 forms a journal for a sleeve 46. The sleeve 46 is part of a main feed bar rocker 47. Rocking motion is given the feed bar rocker 47 by a connecting rod 48.

The connecting rod 48 has a large end 50 journalled on an adjustable eccentric 51 on the drive shaft 18.

The adjustment of the eccentric 51 is effected by means of a lever 52 journalled on a pivot 53 on the transverse wall 31. One end 54 of lever 52 is a detent adapted to engage a notch on eccentric 51. The opposite end 55 of the lever is held up by a hairpin spring 56 on a stud 57. The lower end of the spring rests against the rock shaft 37.

A pin 58 vertically journalled in the cloth plate has one end resting on end 55 of the lever 52. The upper end of pin 58 has a button 59 in a recess in the cloth plate surface. Manual depression of the button 59 causes the detent 54 to engage the notch in eccentric 51 permitting the hand wheel to provide relative rotary adjustment modifying the size of the throw of the eccentric and consequently the extent of motion of the feed bar rocker 47 and the connecting rod 48.

The main feed bar 30 has its front end journalled on a feed lift eccentric 61 on the end of drive shaft 18. At its rear the bar is supported on a pivot 62 which is mounted on the feed rocker. The feed dog 28 on bar 30 is thus given the usual four-motion path.

The differential feed dog 29 is mounted on the differential feed bar 63. The bar is slidably carried in apertured lugs 64, 64 mounted on the outer side of the main feed bar 30.

Intermediate the lugs, the bar 63 has a collar 65. On one side the collar has a laterally extending journal 66 which is slidably carried in a longitudinal slot 67 in the main feed bar. The journal extends through the slot and into a slotted plate 68 on the inner side of the main feed bar.

The outer side of the collar 65 has a cylindrical pivot 69.

Rocker shaft 37 has a rocker arm 70 clamped on its end. This arm has an arcuate slot 71. A drive link 72 journalled on pivot 69 has its opposite end 73 bifurcated to fit around arm 70. A stud screw 74 carried by the bifurcated end and passing through slot 71 pivotally connects the drive link 72 and the rocker arm 70.

Outside of the end 73, an adjustment link 75 is pivotally carried by the screw 74. The free end of link 75 has a pin 76 extending laterally.

A depending bracket 77 is fastened to the underside of the cloth plate opposite the rocker arm 70. This bracket has a horizontal upper plate 78 with a longitudinal slot 79. This registers with a similar slot 80 in the cloth plate.

The bracket 77 has an outer side plate 81. This plate has a central round hole 82. On each side of the hole is a vertical guide slot 83, 83. The bottom of the bracket is bent in to form a flange 84.

The opposite side of the bracket 77 is bent down to form a bar 85. The bar is drilled to form a hole 86 in alignment with hole 82. A pivot bolt 87 is screwed into holes 82 and 86 with the head fitting around hole 82 and the screw threaded end projecting beyond hole 86 where it is held by a nut 88. The pivot bolt carries a loosely fitting sector 89. A coil spring 90 anchored to the bar 85 has its opposite end fitted into a hole 91 in the sector. The latter is thus resiliently held at one end of its permitted movement. The sector has a graduated scale on its periphery. This is visible through the slots 79 and 80, as will be apparent by reference to FIGURES 6, 7 and 8.

One side of the sector has a hole 92 to receive the pin 76.

Each end of the sector has an ear 93. The ears have holes 94 to receive a chain 95 connected with a treadle, knee press or the like so that the sector can be shifted during operation of the sewing machine and the ratio of movement of the differential feed to the main feed can be varied as required.

This is accomplished by the action of the pin 76 rising or falling with the shift of the sector and changing the position of adjusting link 75 and the extent of movement of the drive link 72. This in turn will vary the throw of the differential feed bar 63 and the attached differential feed dog 29.

Means are provided to limit the adjustment of the sector and even give it a predetermined adjusted position. To effect this, the guide slots 83, 83 in the side plate 81, form the guides for two runners 96, 96 with corresponding lateral blocks 97, 97 in the slots.

Adjusting screws 98, 98 pass loosely upward through the flange 84 and the top of the bracket 78.

Above the flange 84 the screws have circumferential grooves in which split collars 99 are received to hold the screws 98, 98 captive.

Below the flange 84, the screws carry spring washers 101 (FIGURES 6 and 8), maintaining tension on the screws for preventing maladjustment due to vibration.

The runners 96, 96 are screw-threaded and free to travel along the screws 98, 98. They are constrained by the blocks 97 in the slots 83.

Stop screws 100, 100 are permanently fixed in the adjacent wall of the sector. They are in the path of the runners and act as stops for the latter. If both runners 96 strike the screws 100, the sector is prevented from movement and the ratio of the differential feed bar to the main feed bar is fixed. However, if either or both runners are lowered on the screws, the sector is given a corresponding freedom of movement and the ratio of the differential feed to the main feed is correspondingly subject to variation. The graduations on the edge of the sector are indicated for example as 1 to 5. This indicates that the movement of the differential feed dog varies from the same movement as the main feed dog to five times the latter. Thus, with a normal setting of fifteen stitches to the inch on the main feed bar, the differential feed may be as great as three-eighths of an inch.

Alternatively, the coil spring 90 may be reversed so that the sector is biased in the opposite direction. This permits the chain 95 to be attached to the opposite ear of the sector.

The adjustment will then provide a maximum ratio between the feeds and allow diminishing variation at will.

The differential four-motion feeding mechanism as above described attains the desired results of stitch variations and ratios during operation of the sewing machine. The example given may be modified in minor details within the scope of the appended claims.

What we claim is:

1. In a sewing machine including a cloth plate and having a main drive shaft, stitch-forming devices driven therefrom, a lower rotary drive shaft, drive means connecting the shafts, a main feed bar, means connecting the lower shaft with the feed bar for imparting feeding movements thereto, a main feed dog on the feed bar, a second feed bar slidably carried by the main feed bar, a differential feed dog on the second feed bar, a rock shaft on the machine, an arm on the rock shaft, a drive link pivoted on the second feed bar and adjustably carried by the arm, a bracket supported on and depending from the cloth plate, a sector pivoted on the bracket, means for bringing about variations in the relative feed movements of said feed dogs and including an adjustment link connecting the drive link with the sector and means for oscillating the sector, to determine the position of said adjustment link, said sector having a portion thereof disposed to be viewable by an operator of the machine and having indicia thereon for indicating the differential feed ratio between the differential feed dog and the main feed dog.

2. Machine structure as defined in claim 1 wherein the means for oscillating the sector comprises a biasing spring supported on the bracket and constantly tending to move the sector in one direction about its pivot and manually operable means for moving the sector in the opposite direction.

3. In a sewing machine including a cloth plate and having a main drive shaft, stitch-forming devices driven therefrom, a lower rotary drive shaft, drive means connecting the shafts, a main feed bar, means connecting the lower shaft with the feed bar for imparting feeding movements thereto, a main feed dog on the feed bar, a second feed bar slidably carried by the main feed bar, a differential feed dog on the second feed bar, a rock shaft on the machine, an arm on the rock shaft, a drive link pivoted on the second feed bar and adjustably carried by the arm, a bracket supported on and depending from the cloth plate, a depending bar on the bracket, a pivot connecting the bracket and bar, a sector oscillatably mounted on said pivot, means for bringing about variations in the relative feed movements of said feed dogs and including an adjustment link connecting the drive link with the sector and means for oscillating the sector, to determine the position of said adjustment link, said sector having a portion thereof disposed to be viewable by an operator of the machine and having indicia thereon for indicating the differential feed ratio between the differential feed dog and the main feed dog.

4. Machine structure as defined in claim 3 wherein the means for oscillating the sector comprises a torsion spring encircling the sector pivot and anchored at one end to the sector and at its other end to the depending bracket bar so as to be effective in constantly tending to move the sector in one direction about its pivot and manually operable means for moving the sector in the opposite direction.

5. Machine structure as defined in claim 3 wherein the means for oscillating the sector comprises a torsion spring encircling the sector pivot and anchored at one end to the sector and at its other end to the depending bracket bar so as to be effective in constantly tending to move the sector in one direcion about its pivot and manually operable means for moving the sector in the opposite direction, provision being made on the bracket for selective reverse mounting of said spring to bias the sector in an opposite direction, thereby to provide for a maximum ratio between the feed dog movements and allow diminishing ratio at will.

6. In a sewing machine having a main drive shaft, stitch-forming devices driven therefrom, a lower rotary drive shaft, drive means connecting the shafts, a main feed bar, means connecting the lower shaft with the feed bar for imparting feeding movements thereto, a main feed dog on the feed bar, a second feed bar slidably carried by the main feed bar, a differential feed dog on the second feed bar, a rock shaft on the machine, an arm on the rock shaft, a drive link pivoted on the second feed bar and adjustably carried by the arm, a bracket on the machine, a sector pivoted on the bracket, means for bringing about variations in the relative feed movements of said feed dogs and including an adjustment link connecting the drive link with the sector, stop members on the sector, blocking means on the bracket in the paths of the stop members, screw means for variably placing the blocking means on the bracket, and means for oscillating the sector, to determine the position of said adjustment link, said sector having a portion thereof disposed to be viewable by an operator of the machine and having indicia thereon for indicating the differential feed ratio between the differential feed dog and the main feed dog.

7. In a sewing machine having a main drive shaft, stitch-forming devices driven therefrom, a lower rotary drive shaft, drive means connecting the shafts, a main feed bar, means connecting the lower shaft with the feed bar for imparting feeding movements thereto, a main feed dog on the feed bar, a second feed bar slidably carried by the main feed bar, a differential feed dog on the second feed bar, a rock shaft on the machine, an arm on the rock shaft, a drive link pivoted on the second feed bar and adjustably carried by the arm, a bracket on the machine, a sector pivoted on the bracket, means for bringing about variations in the relative feed movements of said feed dogs and including an adjustment link connecting the drive link with the sector, stop members on the sector, runners guided on the bracket in the paths of the stop members, adjusting screw members on the bracket and threaded through the runners to be operable to move and place said runners relative to said stop members, and means for oscillating the sector to determine the position of said adjustment link, said sector having a portion thereof disposed to be viewable by an operator of the machine and having indicia thereon for indicating the differential feed ratio between the differential feed dog and the main feed dog.

8. In a sewing machine having a main drive shaft, stitch-forming devices driven therefrom, a lower rotary drive shaft, drive means connecting the shafts, a main feed bar, means connecting the lower shaft with the feed bar for imparting feeding movements thereto, a main feed dog on the feed bar, a second feed bar slidably carried by the main feed bar, a differential feed dog on the second feed bar, a rock shaft on the machine, an arm on the rock shaft, a drive link pivoted on the second feed bar and adjustably carried by the arm, a slotted bracket on the machine, said machine having a cloth plate with a slot in registry with the slot of the bracket, a sector pivoted on the bracket with its periphery visible through said slots, means for bringing about variations in the relative feed movements of said feed dogs and including an adjustment link connecting the drive link with the sector and means for oscillating the sector, to determine the position of said adjustment link, said sector having a portion thereof disposed to be viewable by an operator of the machine and having indicia thereon for indicating the differential feed ratio between the differential feed dog and the main feed dog.

9. In a sewing machine having a main drive shaft, stitch-forming devices driven therefrom, a lower rotary drive shaft, drive means connecting the shafts, a main feed bar, means connecting the lower shaft with the feed bar for imparting feeding movements thereto, a main feed dog on the feed bar, a second feed bar slidably carried by the main feed bar, a differential feed dog on the second feed bar, a rock shaft on the machines, means providing, an eccentric drive from the rotary drive shaft to the rock shaft, an arm on the rock shaft, a drive link pivoted on the second feed bar and adjustably carried by the arm, so that variations in the relative movements imparted to the feed dogs can be made, a sector pivotally mounted on the machine, a link eccentrically pivoted on the sector and connected with the drive link and means for oscillating the sector, to determine the position of said adjustment link, said sector having a portion thereof disposed to be viewable by an operator of the machine and having indicia thereon for indicating the differential feed ratio between the differential feed dog and the main feed dog.

10. In a sewing machine having a main drive shaft, stitch-forming devices driven therefrom, a lower rotary drive shaft, drive means connecting the shafts, a rock shaft on the machine, a main feed bar journaled on the rock shaft, means connecting the lower shaft with the feed bar for imparting feeding movements thereto, a main feed dog on the feed bar, a second feed bar slidably carried by the main feed bar, an arm on the rock shaft, a drive link pivoted on the second feed bar and adjustably carried by the arm so that variations in the relative movements imparted ot the feed dogs can be made, a bracket on the machine, a sector pivoted thereon, an adjustment link connecting the drive link with the sector and means for oscilating the sector, to determine the position of said adjustment link, said sector having a portion thereof disposed to be viewable by an operator of the machine and having indicia thereon for indicating the differential feed ratio between the differential feed dog and the main feed dog.

11. In a sewing machine having a main drive shaft, stitch-forming devices driven therefrom, a lower rotary drive shaft, drive means connecting the shafts, a main feed bar, means connecting the lower shaft with the feed bar for imparting feeding movements thereto, a main feed dog on the feed bar, a second feed bar slidably carried by the main feed bar, a differential feed dog on the second feed bar, a rock shaft on the machine, an arm on the rock shaft, a drive link pivoted on the second feed bar and adjustably carried by the arm, a bracket on the machine, a sector pivoted thereon, an adjustment link connecting the drive link with the sector, stop members on the sector, blocking means on the bracket in the paths of the stop members, and means for oscillating the sector, said sector including a peripheral portion disposed to be viewable by an operator of the machine and having indicia thereon for indicating the differential feed ratio between the differential feed dog and the main feed dog.

12. In a sewing machine having a main drive shaft, stitch-forming devices driven therefrom, a lower rotary drive shaft, drive means connecting the shafts, a main feed bar, means connecting the lower shaft with the feed bar for imparting feeding movements thereto, a main feed dog on the feed bar, a second feed bar slidably carried by the main feed bar, a differential feed dog on the second feed bar, a rock shaft on the machine, an arm on the rock shaft, a drive link pivoted on the second feed bar and adjustably carried by the arm, a slotted bracket on the machine, said machine having a cloth plate with a slot in registry with the slot of the bracket, a sector pivoted on the bracket with its periphery visible through said slots, an adjustment link connecting the drive link with the sector and means for oscillating the sector, said pivoted sector being disposed with its periphery projecting into the slot in the cloth plate and having indicia thereon for indicating the differential feed ratio between the differential feed dog and the main feed dog.

References Cited

UNITED STATES PATENTS

| | | | |
|---|---|---|---|
| 2,669,205 | 2/1954 | Hayes | 112—209 |
| 2,965,056 | 12/1960 | Wallenberg et al. | 112—208 |
| 2,974,617 | 3/1961 | Hacklander | 112—209 |

JORDAN FRANKLIN, *Primary Examiner.*

R. J. SCANLAN, JR., *Examiner.*